April 18, 1933.   T. C. HENNEBERGER   1,904,227
GAS PRESSURE ALARM SYSTEM FOR CABLES
Filed June 9, 1931
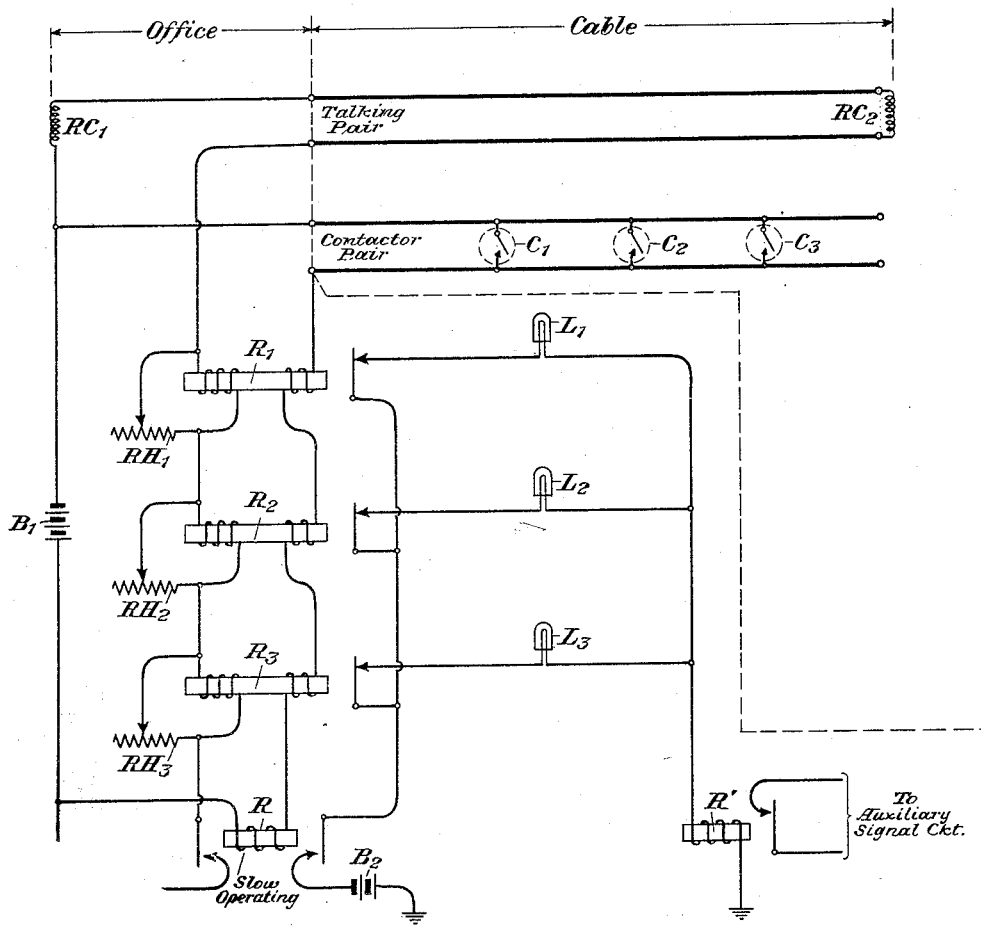
INVENTOR
*T. C. Henneberger*
BY
ATTORNEY Patented Apr. 18, 1933

1,904,227

UNITED STATES PATENT OFFICE

THOMAS C. HENNEBERGER, OF CALDWELL, NEW JERSEY, ASSIGNOR TO AMERICAN TELEPHONE AND TELEGRAPH COMPANY, A CORPORATION OF NEW YORK

GAS PRESSURE ALARM SYSTEM FOR CABLES

Application filed June 9, 1931. Serial No. 543,232.

This invention relates to indicating means, and more particularly to arrangements of apparatus and circuits for indicating at which one of a number of fixed points a long pair of conductors is short-circuited.

In connection with the testing of long cables it is the practice to maintain the cable under gas pressure. If this pressure falls below the normal or a predetermined value it is desirable that an indication be given at some office or other point along the line of the cable. Accordingly, it is good practice to install at intervals along the cable low pressure alarm contactors or equivalent devices, which operate to short-circuit a pair of spare quad and produce a visual or audible signal at a repeater station, for instance, when the pressure falls.

In the application of S. P. Shackleton, Serial No. 423,834, filed January 27, 1930, now a patent, Number 1,855,321 (assigned to the assignee of the present invention), there is disclosed as an alarm system an arrangement comprising a plurality of signaling devices corresponding in number and arrangement to the short-circuiting devices along the cable and means for causing the operation in response to the operation of one of the short-circuiting devices of the corresponding one of the signaling devices. This arrangement of Shackleton has one disadvantage: In the cases of the contactors near the end of the cable distant from the indicating point, the conductor resistance between adjacent contactors is small compared with the total conductor resistance between the indicating point and the contactors, and this resistance between adjacent contactors may be no greater than the changes in total conductor resistance caused by atmospheric changes such as temperature variation affecting the cable. Accordingly, the current ranges representative of the various contactors tend to overlap and it is not unlikely that a false indication will be given.

The applicant's invention is an improvement over Shackleton's invention. The circuit arrangement is such that the operating windings of the differential relays are in circuit with the contactor pair while the biasing windings of these relays are adapted to be connected in circuit with an auxiliary pair of conductors in the cable, as will be more fully disclosed hereinbelow.

The applicant's arrangement has as its principal object and advantage the overcoming of the difficulty due to atmospheric changes suggested above. Thus, even in the cases of the contactors relatively distant from the indicating point or office, there is no danger of false indication as to which contactor is operated.

The invention will be clearly understood when the following detailed description of one desirable embodiment is read with reference to the accompanying drawing, which shows the applicant's arrangement in diagrammatic form.

With reference to the drawing, there are disclosed two pairs of conductors, which it is understood are conductors forming two pairs of the same long cable. The lower conductor pair is the contactor pair and is equipped with devices $C_1$, $C_2$ and $C_3$. These devices are low pressure contactors spaced along the cable at intervals of convenient length and are designed to short-circuit the pair when the gas pressure falls below a predetermined value. The upper pair of conductors is an auxiliary pair of the cable. As is indicated in the drawing, this auxiliary pair may be a talking pair.

There is indicated at the left an office, which may be a repeater station, and at this office are located the apparatus for giving the indication of contactor operation. It will be noted that retardation coils $RC_1$ and $RC_2$ are associated with the talking pair. These or similar elements are necessary when a talking pair is used as the auxiliary pair to prevent interference with the normal use of the talking pair.

At the office there are shown three differential relays $R_1$, $R_2$ and $R_3$ and a fourth relay R, which should be slow-operating. Corresponding to the relays $R_1$, $R_2$ and $R_3$ are signal lamps $L_1$, $L_2$ and $L_3$, which have their circuits to the battery $B_2$ under the control of the armatures of relays $R_1$, $R_2$ and $R_3$, respectively, (through release contacts)

and of the right-hand armature of the slow-operating relay R. It will be understood that the three differential relays and the three lamps are representative of any suitable number of elements, the number corresponding to the number of contactors such as $C_1$, $C_2$ and $C_3$.

Each of the differential relays has a right-hand operating winding and a left-hand biasing winding. The operating windings are connected in series with the conductors of the contactor pair, the winding of the slow-operating relay R and a battery $B_1$. The biasing windings of the differential relays are in circuit with the conductors of the talking pair and the battery $B_1$, and this circuit is completed over the left-hand armature and contact of relay R upon the operation of that relay. Shunted across each of the biasing windings of the differential relays is a rheostat, these elements being designated $RH_1$, $RH_2$ and $RH_3$.

It is desired, of course, that when contactor $C_1$, for instance, operates to short-circuit the contactor pair, lamp $L_1$ lights while the lamps $L_2$ and $L_3$ remain unlighted. With the arrangement shown it is, therefore, desired that upon the operation of contactor $C_1$, for instance, the armature of relay $R_1$ remain in contact while the relays $R_2$ and $R_3$ operate to break their respective contacts. Accordingly, the current in the windings of the differential relays must be adjusted so that the relay corresponding to the operated contactor will have substantially equal ampere-turns in its two windings while the other relays have unequal ampere-turns in their windings. Suitable means for making the necessary adjustments may take the form of the rheostats $RH_1$, $RH_2$ and $RH_3$ shown shunted across the biasing windings of relays $R_1$, $R_2$ and $R_3$, respectively. It will be understood, however, that the essential result of this adjustment is the substantial equalization of the ampere-turns in the local winding circuits of any one of the differential relays, and the adjusting devices might well take other forms; for instance, the rheostats could be shunted across the operating windings instead of across the biasing windings.

Let it be assumed that contactor $C_3$ has operated to short-circuit the contactor pair. A circuit is now completed through the right-hand or operating windings of relays $R_1$, $R_2$ and $R_3$, the winding of slow-operating relay R, the battery $B_1$ and the conductors of the contactor pair. The operating windings of all three relays $R_1$, $R_2$ and $R_3$ are now energized and the armatures attracted; thus the circuits through the lamps $L_1$, $L_2$ and $L_3$ are broken. After a short delay the slow-operating relay R will operate, closing its contacts. The left-hand armature of relay R now completes a circuit through the left-hand or biasing windings of the differential relays, the conductors of the talking pair and the battery $B_1$. The biasing windings of the relays are wound so as to oppose the effect of the operating windings. Due to the adjustment discussed above, in the case chosen for illustration relays $R_1$ and $R_2$ will have a substantial difference between the ampere-turns of the two windings, and the armatures will remain attracted. Relay $R_3$ corresponding to contactor $C_3$ will, however, have substantially equal ampere-turns in its two windings, and the armature of this relay will release. Since the right-hand contact of relay R is now closed, a circuit is completed through the battery $B_2$ and the filament of lamp $L_3$, and this lamp will light to indicate that contactor $C_3$ is the contactor that has operated. Lamps $L_1$ and $L_2$ will, of course, remain unlighted.

If contactors $C_2$ and $C_3$, for instance, are at a considerable distance from the office, it will be understood that the conductor resistance of the contactor pair between the two contactor points will be small compared with the total resistance of the contactor pair and that the effects of atmospheric changes such as temperature variation might well cause a false indication. In the applicant's arrangement, however, it will be noted that the biasing current of the differential relays is in part controlled by the resistance of the talking pair, which is included in the cable with the contactor pair and accordingly is subject to the same atmospheric changes. Thus any resistance change in the contactor pair which might otherwise cause false indication is offset by a proportionate resistance change in the talking pair. Therefore, the applicant's arrangement gives a reliable indication as to which one of the contactors has operated.

It will be noted that a relay R' has its winding included in circuit with the battery $B_2$ and the filaments of the lamps. When any one of the lamps is operated this relay R' will also operate, closing its contact to complete an auxiliary signal circuit—including an alarm bell, for instance.

While the invention has been specifically disclosed for the purpose of illustration, it is to be understood that it is capable of embodiment in other and different forms within the scope of the appended claim.

What is claimed is:

In association with a cable including a testing pair of conductors and an auxiliary pair of conductors, said testing pair having a plurality of short-circuiting devices spaced therealong and designed to operate thereon, apparatus grouped at a single station on the line of said cable, said appartus comprising a plurality of differential relays corresponding in number to said short-circuiting devices, an auxiliary relay, a plurality of signaling devices each controlled by one of said differential relays, and a source of voltage, each of said differential relays having a first winding in series with the conductors of said testing pair, the winding of said auxiliary relay and said source of voltage and a second winding adapted to be connected in series with the conductors of said auxiliary pair and said source of voltage upon the operation of said auxiliary relay, and means associated with each of said differential relays for adjusting the effective ampere-turns of the windings thereof.

In testimony whereof, I have signed my name to this specification this 8th day of June 1931.

THOMAS C. HENNEBERGER.